United States Patent

[11] 3,628,060

[72] Inventor  Richard L. Fussell
                Chester Springs, Pa.
[21] Appl. No. 83,321
[22] Filed      Oct. 23, 1970
[45] Patented   Dec. 14, 1971

[54] SIGNAL PEAK DETECTION SYSTEM USING SENSITIZED THRESHOLD DETECTORS
9 Claims, 5 Drawing Figs.

[52] U.S. Cl. .................................... 307/235, 328/117
[51] Int. Cl. ...................................... H03k 5/20
[50] Field of Search .......................... 307/235; 328/114–117

[56]           References Cited
           UNITED STATES PATENTS
3,488,524  1/1970  Parrott, Jr. ................. 307/235 X
3,544,983  12/1970 Wallace, Jr. et al. ......... 307/235 X Primary Examiner—Donald D. Forrer
Assistant Examiner—John Zazworsky
Attorney—Carl Fissell, Jr.

ABSTRACT: A signal peak detection system is disclosed which in a preferred embodiment utilizes a pair of threshold detectors each having a normally conducting input stage. The initial actuation of one of the detector stages, that is, the cessation of conduction in its input stage, in response to an input analog signal provides threshold information to decision logic for initiating signal analysis processing. Circuit means are provided to remove the "turn-on" bias current from both detector stages coincidentally with the above-mentioned initial actuation. The latter operation "sensitizes" the other detector but the input stage thereof remains conducting due to the slope of the input signal applied thereto. Subsequently, as the input signal passes over-the-peak, only a minimal $dv/dt$ input is necessary to actuate this last detector. The concurrent actuation of both detectors causes a peak indication substantially close to the true signal peak to be presented to the decision logic. An output from the system is generated only when predetermined characteristics of the input signal have been validated by the decision logic.

INVENTOR.
RICHARD L. FUSSELL
BY
Francis A. Varallo
AGENT

SIGNAL PEAK DETECTION SYSTEM USING SENSITIZED THRESHOLD DETECTORS

CROSS REFERENCE TO RELATED APPLICATIONS

The basic circuit element, a threshold switch, employed in the present invention, as well as the following reference applications, is described and claimed in application Ser. No. 679,965, now U.S. Pat. No. 3,546,482, "Signal Peak Detection System," by Clifford J. Bader and Richard L. Fussell. A second copending application Ser. No. 68,177 for "Sensitive Threshold and Over-the-Peak Signal Detection Systems," and a third application Ser. No. 76,905 filed Sept. 30, 1970 for "System for the Detection and Validation of Signal Peaks," both filed in the name of Richard L. Fussell, disclose related detector circuits and systems. All of the aforementioned applications are assigned to the same assignee as the present application.

BACKGROUND OF THE INVENTION

The invention disclosed herein was made in the course of, or under a contract with, the Department of the Navy.

The signal peak detection system described and claimed in the reference Ser. No. 679,965 application, comprises a plurality of threshold switches which provide an output level transition when the absolute amplitude of the input signal information begins to decline after passing through a maximum value. The second reference application points out that while the system described in application Ser. No. 679,965 is suited for a variety of applications, it does not exhibit the capability of validating the input signal characteristics as a condition for generating an over-the-peak output indication.

In accordance with the present invention and that described in the reference second and third copending applications, circuits and techniques are provided which considerably extend and expand the detector system of the reference Ser. No. 679,965 application. The system described and claimed in the second and third applications, as well as the system described and claimed herein, provide an optimum hardware and functional interface between low-level, long-period analog circuits and digital decision logic, thereby performing sensitive analog-to-digital conversion. Moreover, both initial and final information is applied to the decision logic. The former effects signal analysis processing at an appropriate time before the signal peak occurs, and the latter indicates a return to the analog steady state condition where no input signal is present. The systems described have the capability of limiting the number of the decision logic "start processings" signals to those which have a high probability of satisfying peak detection conditions. Also, the systems provide a direct information constraint to the decision logic that the input signal possesses invalid characteristics. The "digital" signal applied to the decision logic is designed to have a fast rise and fall characteristic with minimum noise content, although the analog signal may be extremely slow and incorporate significant electrical noise.

The full latch system described in the second copending application provides highly efficient peak signal detection suitable for a wide variety of applications. However, in applications where the input signal amplitudes are close to minimum circuit thresholds, the full latch system provides an over-the-peak recognition which is considerably removed from the true signal peak. The detection systems described in the present and the third reference applications are particularly useful in those special applications where the last-mentioned condition cannot be tolerated. In performing the peak detection function the system described and claimed herein utilizes a novel approach not taught in any of the reference applications.

SUMMARY OF THE INVENTION

In accordance with a preferred embodiment of the present invention, an electrical analog signal is applied both in-phase and phase-inverted to the respective input terminals of a pair of threshold detectors. Each detector includes an input current amplifying stage which serves as a threshold switch. A "sensitizing" current amplifying stage is coupled in common to both detectors. The status of each of the detectors in response to the input signal is monitored by logic elements to generate an output peak detection signal.

In operation, the input threshold switch stages of the detectors are in a conducting state in the absence of an input signal. The "sensitizing" stage is nonconducting at this time. The DC current biasing the stages to conduction is derived from the potential on the output electrode of the "sensitizing" stage, which electrode is coupled to a source of supply potential by suitable impedance means. An applied signal of suitable amplitude causes a first threshold switching in which one of the threshold switch stages is driven to nonconduction. It is a key feature of the present invention that the switching of the input stage to nonconduction results in the conduction of the "sensitizing" stage, and the consequent removal of the "turn-on" bias from both detector input stages. The threshold switch stage of the detector not initially actuated, remains conducting due to the polarity of the $dv/dt$ input signal. A second threshold switching occurs as the analog signal begins to decline after passing through its peak. The last-mentioned detector having been sensitized by the removal of the turn-on bias, is driven to nonconduction by a minimal $dv/dt$ input of proper polarity. Since the $dv/dt$ of the input signal does not have to overcome the DC bias before turning off the sensitized detector, the point of actuation of the detector is substantially close to the true signal peak. Concurrence of nonconduction in the detector input stages is recognized as an occurrence of an over-the-peak condition.

The present system also includes decision logic and means for its initiation, whereby the characteristics of the input analog signal are analyzed and predetermined conditions met prior to the generation of a system output indicative of a peak condition. The decision logic also supplies reset control commands to the threshold detectors on a system demand basis.

DESCRIPTION OF THE PREFERRED EMBODIMENTS

Figure 1:
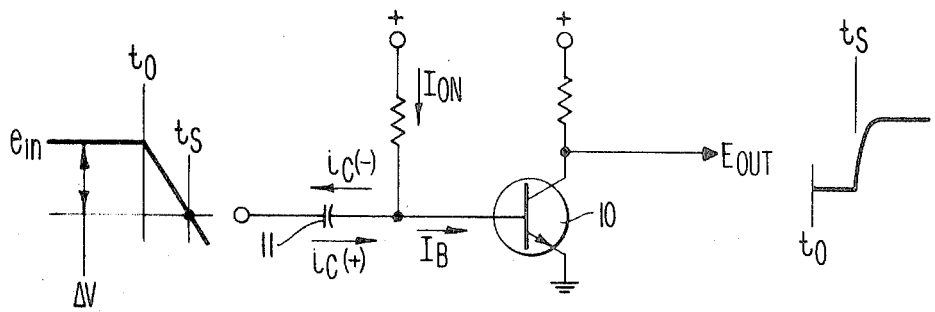
FIG. 1 is a schematic diagram of the basic threshold switch common to the present and the reference applications.

The basic circuit element, the threshold switch, depicted in FIG. 1 is utilized in the present invention as well as that of the reference applications. The circuit provides the capability of generating switching signals at very low analog signal amplitudes, for example, less than 10 millivolts peak, and very low frequencies, less than 0.1 Hz. The current consumed by the basic switch is less than 5 microamperes. Although the operation of the basic switch has been described in detail in the reference Ser. No. 679,965 application, it is believed helpful at this time to review its characteristics.

With reference to FIG. 1, the switching transistor 10 is normally in a conducting state in the absence of an applied analog signal $e_{in}$ as a result of a small DC bias current $I_{ON}$. The analog signal of interest is coupled to transistor 10 by way of an appropriate capacitor 11 and hence in the steady state prior to time $T_0$ results in no additional current contribution. That is, the capacitor current $i_c = 0$ where $dv/dt$ of the input signal is also equal to zero. The capacitive coupling also permits a generous tolerance for analog steady state voltage conditions over a wide DC dynamic range. At time $t_0$, the input voltage starts to go negative. The switching of transistor 10 occurs only when the analog signal begins the develop a sufficiently negative $dv/dt$. Under these conditions capacitive current, $i_c(-) = -C\, dv/dt$ occurs and since the capacitive current is greater than the bias current $I_{ON}$ the transistor conduction can no longer be sustained and switching commences at time $t_S$. The output $E_{OUT}$ of the threshold switch is developed on the collector electrode of transistor 10. A knowledge of the transistor parameters defines a predictable switching point since the device will not turn off instantaneously when the base current $I_B$ becomes zero. This face is illustrated in FIG. 1 by the negative ramp of the input signal transition voltage $\Delta V$, which results in a transistor base voltage change, $-\Delta V_{BE}$, in addition to a base current change. As a result, the precise switching conditions are $de_{in}/dt\ \ I_{ON/C}$ and
$-\Delta V\ \ V_{BE(Sw)}$ where $V_{BE(Sw)}$ is the required device transition voltage for immediate switching. Control of the device base transition voltage requirement is best achieved by specifying the transistor collector-to-emitter saturation voltage which is a readily measurably and process-controllable parameter.

It should be noted that for an applied signal positive slope the capacitor current $i_c(+) = +C\, dv/dt$ merely adds to the bias current $I_{ON}$ thereby increasing the transistor base current and maintaining the transistor in a conducting state. It is therefore apparent that the basic circuit of FIG. 1 is substantially unresponsive to positive-going input signals.

Figure 2:
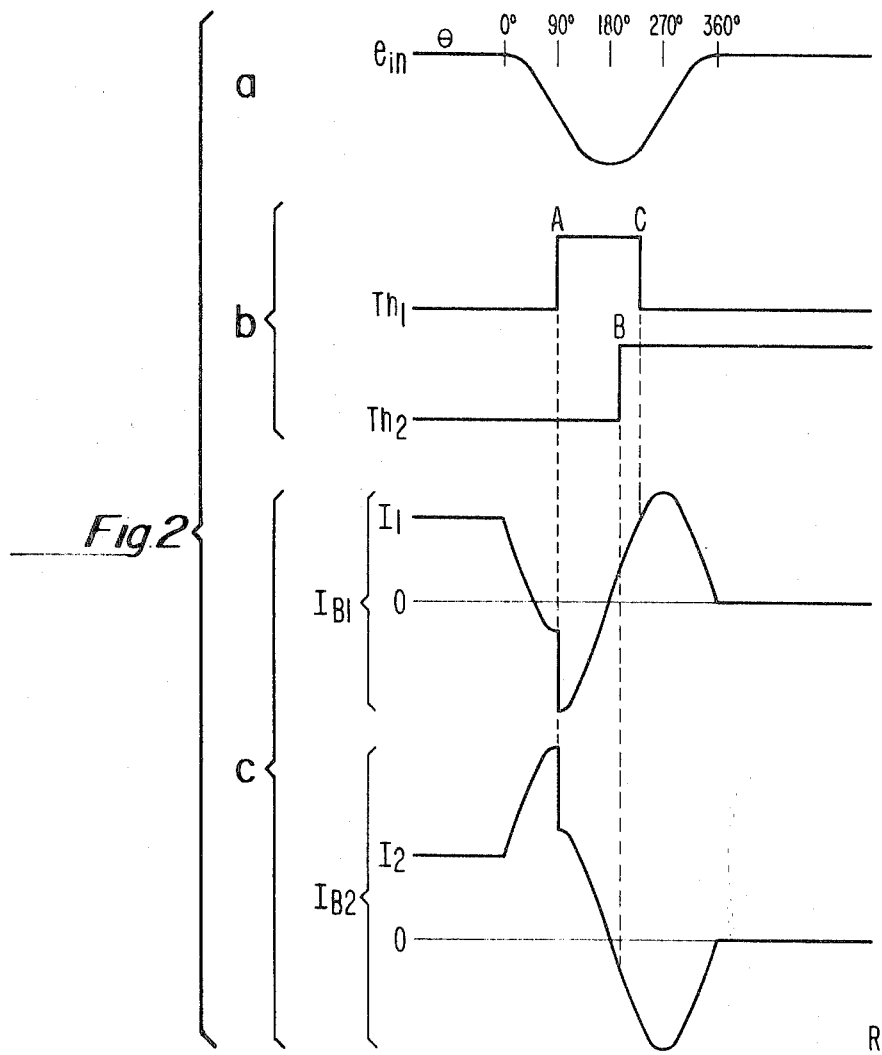
FIG. 2, (a–c) illustrate a representative input signal and the waveforms resulting from the switching action of the threshold detector stages.
Figure 3:
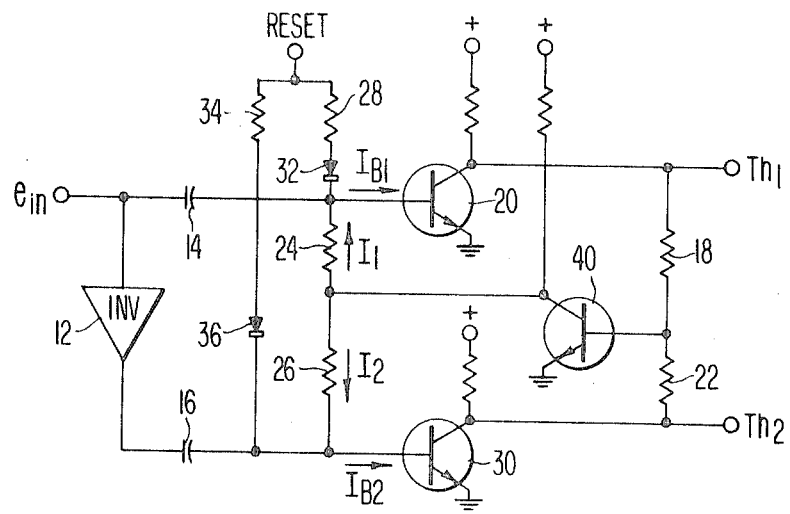
FIG. 3 is a schematic representation of a pair of threshold switches arranged in a "sensitized" configuration.

FIGS. 2(a–c) illustrate the signal switching conditions which occur in the detector configuration of FIG. 3 for a single peak analog signal. FIG. 2a illustrates a typical input signal designated $e_{in}$. The signal characteristics may be specified at any given time with reference to the angle $\theta$ which covers 0° to 360°, the entire period of the input signal. The waveforms of FIG. 2b illustrate the output voltage levels $Th_1$ and $Th_2$ occurring during the switching of the respective threshold detectors in response to $e_{in}$. FIG. 2c depicts the base currents $I_{B1}$ and $I_{B2}$ for the respective threshold switches during the switching conditions of FIG. 2b.

FIG. 3 illustrates a sensitized detector configuration, utilizing a pair of the basic threshold switches of FIG. 1, comprising transistors 20 and 30 and a common "sensitizing" stage which includes transistor 40. A signal inverter $dv/dt$ is also provided. It should be understood that if the source itself of the input analog signal provides the push-pull drive required by the system, the signal inverter is unnecessary and can be eliminated. If an inverter must be used, numerous varieties of this circuit, well known to those skilled in the electronics art, may be successfully employed. It has been found, for example, that the use of a stabilized, feedback-type unit gain, inverting amplifier is particularly advantageous because of the inherent low output impedance and stability of such a configuration. The input signal $e_{in}$ is coupled to the base electrodes of transistors 20 and 30 respectively by capacitors 14 and 16. The collector electrodes of transistors 20 and 30 are coupled respectively to the base electrode of transistor 40 by resistors 18 and 22. Resistors 24 and 26 provide parallel paths for bias currents $I_1$ and $I_2$ (each equivalent to $I_{ON}$ in FIG. 1) to flow from a common point on the collector of transistor 40 to the respective base electrodes of transistors 20 and 30. The base currents for transistors 20 and 30 are designated $I_{B1}$ and $I_{B2}$. Also included in the circuit of FIG. 3 are parallel reset current paths comprised of resistor 28, diode 32, and resistor 34, diode 36 which couple a source of reset current respectively to the base electrodes of transistors 20 and 30. The output voltages appearing on the collectors of transistors 20 and 30 are designated $Th_1$ and $Th_2$ respectively.

With reference to FIGS. 2a–2c and FIG. 3, the following circuit switching results will occur for the analog signal depicted in FIG. 2a. For steady state operation where the input signal angle $\theta$ is less than 0°, both threshold switch transistors 20 and 30 are conducting. $Th_1$ and $Th_2$, the respective outputs of the switches, are substantially at ground potential. The base electrode of transistor 40 is likewise at ground potential and the transistor is nonconducting. The voltage on the collector of transistor 40 at this time approaches that of the source of the plus supply potential. Transistors 20 and 30 are biased to the conducting state by currents $I_1$ and $I_2$ as illustrated in FIG. 2c. Also at this time, there is no reset control signal present at the RESET terminal.

The first threshold switching occurs as the input signal angle $\theta$ proceeds from 0° toward 180°. At this time, transistors 20 experiences a negative-going input via capacitor 14 and transistor 30 experiences a positive-going input via capacitor 16 by virtue of inverter 12. At point A in the vicinity of the signal 90° angle, transistor 20 is switched to nonconduction by the $-dr/dt$ input on its base electrode. The $Th_1$ output rises to approximately the level of the supply potential. As will be described in detail hereinafter in connection with the system of FIG. 4, the switching of transistor 20 and the resultant output signal therefrom is utilized to initiate the logic processing of the input signal characteristics by the decision logic. Simultaneously with the switching of transistor 20 a positive-going potential is coupled to the base of transistor 40 through resistor 18 and the latter transistor is driven to conduction. The voltage on the collector of transistor 40 falls to approximately ground potential, and the bias currents $I_1$ and $I_2$ are terminated. This is depicted in FIG. 2c as the sharp negative-going drop in base currents $I_{B1}$ and $I_{B2}$. Transistor 30 however, remains in its normal conducting state by the $+dv/dt$ base current generated by the input signal. As indicated in FIG. 2b, $Th_2$ remains at a "low" level at this time.

A second threshold switching occurs when $\theta$ is greater than 180° and less than 360°. At the 180° point, the input signal peak, the threshold switch input $dv/dt$ conditions reverse and transistor 20 experiences a $+dv/dt$ input while transistor 30 experiences a $-dv/dt$ input. At a point B just beyond the true signal peak, transistor 30 is switched to the nonconducting state by a minimal $-dv/dt$ input. As noted hereinbefore, the termination of the "turn-on" bias currents $I_1$ and $I_2$ upon the initial actuation of transistor 20 at point A, eliminates the need for overcoming the bias by the $-dv/dt$ input and the switching of transistor 30 occurs substantially close to the true signal peak. At this time, both transistors 20 and 30 are nonconducting. As will be described in connection with the system of FIG. 4 the concurrent "high" level outputs from both threshold detectors are indicative of a peak indication and as such will be processed by the decision logic.

As the input signal angle $\theta$ proceeds toward 360°, at point C, the $+dv/dt$ input on the base of transistor 20 causes $I_{B1}$ to reach the $I_1$ level (FIG. 2c) thereby causing transistor 20 to "recover," that is, return to its conducting state. This is illustrated in FIG. 2b by the drip in output voltage $Th_1$ to its original "low" level.

Figure 4:
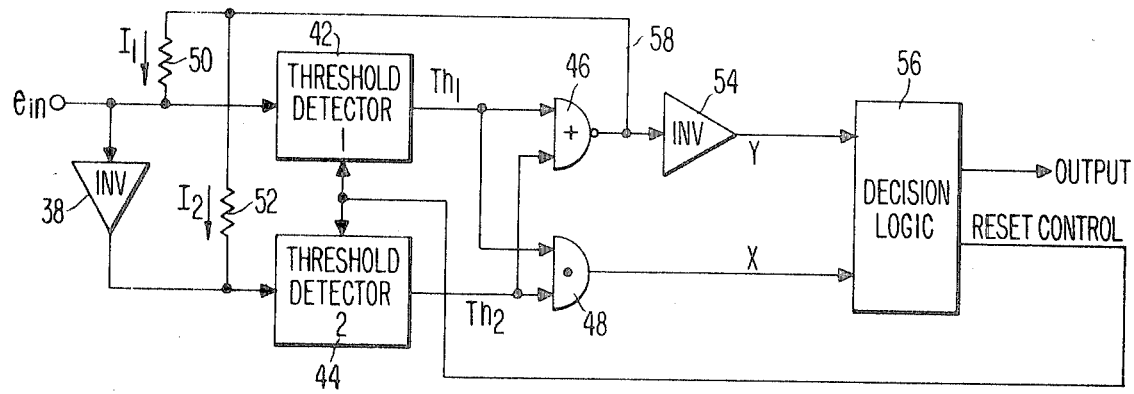
FIG. 4 is a block diagram of a peak detection system in accordance with the present invention.

The significance of the present invention will become more fully apparent from a consideration of the complete system implementation of FIG. 4 in conjunction with the waveforms of FIGS. 2a–2c inclusive. Threshold Detector 1 and Threshold Detector 2, reference numerals 42 and 44 may be each similar to the basic threshold switch of FIG. 1. The designations $Th_1$ and $Th_2$ represent the outputs from the respective detectors 42 and 44. A signal phase inverter 38 provides the push-pull drive required by the system. FIG. 4 also illustrates a NOR-gate 46 and AND-gate 48, two impedances 50 and 52 providing paths for currents $I_1$ and $I_2$ respectively, a second inverter 54, and a decision logic block 56. The output from NOR-gate 46 is acted upon by inverter 54 and if the output of the latter is "high" it is designated the Y-signal. The conditions for "-processing start and sensitize," and "reset stop" are indicated to the decision logic by the Y-signal. A "high" level output from AND-gate 48 is designated the X-signal and indicates to logic the "over-the-peak" condition.

The system conditions for the configuration of FIG. 4 with respect to the analog signal of FIG. 2a are as follows. During steady state operation, where the input signal angle $\theta$ is less than 0°, the outputs $Th_1$ and $Th_2$ from detectors 42 and 44 are "low." Consequently the inputs to NOR-gate 46 are "low"

and the output therefrom appearing on line 58 is "high." This condition provides for the generation of "turn-on" bias currents $I_1$ and $I_2$ for the detector input threshold switches. Since the input to inverter 54 is "high," its output is "low," and there is no Y-signal indication to the Decision Logic 56. Likewise there is no X-signal output from AND-gate 48.

With the first threshold switching at point A, with reference to FIGS. 2a and 2b, detector 42 is actuated and $Th_1$ rises to a "high" level. Simultaneously, the output of NOR-gate 46 on line 58 drops to substantially zero potential, and the bias currents $I_1$ and $I_2$ are removed from both detectors. It should be apparent from the foregoing that the "sensitizing" transistor 40 in FIG. 3 and the NOR-gate 46 of FIG. 4 are substantially equivalent in their function of removing the DC bias from both detectors upon the initial actuation of one of them. Accordingly, while the embodiments of FIGS. 3 and 4 are included herein as being "preferred," the present invention should not be considered limited to them. Other circuits and configurations for performing the aforementioned function may be required in particular applications, and in the light of the teaching found herein will readily suggest themselves to those skilled in the electronics art.

With the termination of the bias currents $I_1$ and $I_2$ at point A, the inverter 54 supplies a Y-signal to decision logic 56 to initiate processing of the input analog signal.

At point B, FIGS. 2b and 2c, just beyond the true signal peak of $e_{in}$, a second threshold switching occurs. Detector 44 is actuated, $Th_2$ rises to a "high" level and with both inputs to AND-gate 48 "high" at this time, an X-signal is applied to decision logic 56 to indicate the occurrence of an "over-the-peak" condition.

The design of the decision logic 56 will depend upon particular operating requirements. Depending on the design, a reset control signal will be applied to both threshold detectors 42 and 44 at a time after logic initiation and/or a peak detection recognition. The reset control will establish in combination with the input signal, "turn-on" conditions for the detector input stages. The threshold detection output signals $Th_1$ and $Th_2$ will not return to steady state levels until the detector input stages (e.g. transistors 20 and 30 of FIG. 3) are fully conducting, and by this means, the threshold detector outputs accurately define the point at which the reset control signal may be terminated.

Figure 5:
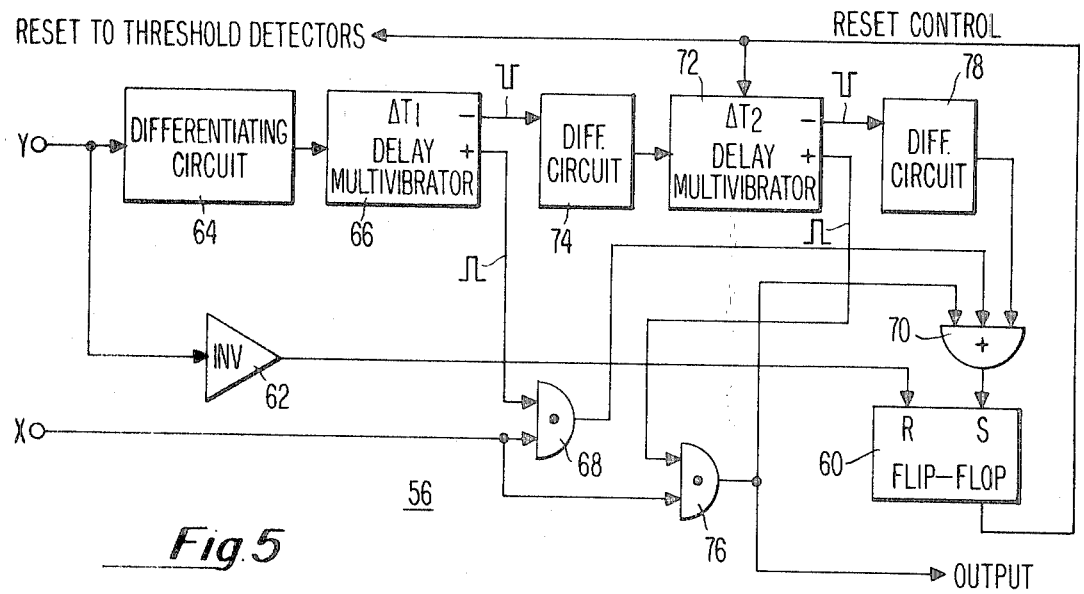
FIG. 5 is a logic diagram for use in providing the "decision logic" for the system of FIG. 4.

FIG. 5 is a logic diagram which may be utilized as the decision logic block 56 of FIG. 4. It should be understood that the diagram of FIG. 5 has been included merely for purposes of example and that the decision logic may take numerous forms depending upon the application of the detector system. The particular form of decision logic to be employed rests with, and is well within the skill of, the logical designer. Accordingly, the present invention should not be considered limited by the particular design illustrated in FIG. 5.

It is the purpose of the decision logic of FIG. 5 to validate the characteristics of the input analog signal prior to generating an output indicative of an over-the-peak detection. For example, assuming prior knowledge of the frequency and waveform characteristics of the input signals expected to be received by the detector system of FIG. 4, the occurrence of an X-(over-the-peak) signal from AND-gate 48, at a time too soon after a Y-(initiate logic) signal from NOR-gate 46, is treated as an invalid condition and no output "over-the-peak" signal is generated by the detector system. Such invalid condition may result from a variety of causes, for example, a spurious noise spike superimposed on the analog signal or an analog signal having a higher frequency that that acceptable in a particular application —such conditions causing the decision logic to ignore the presence of the X-signal. The flexibility of the decision logic design is further emphasized by the last-mentioned situation where readjustment of the decision logic parameters may be made to validate such high frequency input signals, if desired.

The processing of the X- and Y-signals by the decision logic of FIG. 5 proceeds as follows. In a steady-state condition, neither X- nor Y-signals are present (the levels on the X- and Y-terminals of FIG. 5 are "low"), the flip-flop 60 is in a reset condition as a result of the "high" voltage level applied to the R-terminal thereof by inverter 62.

It will be assumed for purposes of explanation that the applied analog signal is that depicted in FIG. 2a, and that in accordance with the operation of the system of FIG. 4 as described hereinbefore, a Y-signal is applied from NOR-gate 46 to the Y-terminal of the decision logic. This Y-signal is acted upon by the differentiating circuit 64 and the output thereof initiates a "check period" by triggering a delay multivibrator 66 to provide a predetermined $\Delta T_1$ pulse period. The inverted steady-state signal applied to the R-terminal of flip-flop 60 is also removed at this time. During the $\Delta T_1$ period no valid X-signal is anticipated. If an X-signal from AND-gate 48 does appear, it is coupled to the X-terminal of the decision logic, and is applied in coincidence with the positive pulse output of delay multivibrator 66, to AND-gate 68. The output from AND-gate 68 is coupled through OR-gate 70 to the S (set) terminal of flip-flop 60. The setting of flip-flop 60 causes a reset control signal to be generated by the flip-flop, which signal is applied in common to the respective reset terminals of the threshold detectors 42 and 44. The duration of the reset control signal is a function of the analog signal and the recovery time for the detector threshold switch stage. The reset control signal is also applied to a second delay multivibrator 72 to inhibit its operation. Differentiating circuit 74 differentiates the output negative pulse from delay multivibrator 66 and normally triggers delay multivibrator 72. However in the example under consideration, where an invalid X-signal occurred during $\Delta T_1$, the presence of a reset control signal prevents the differentiated output of circuit 74 from triggering delay multivibrator 72 and initiating a $\Delta T_2$ pulse period.

In a second situation, it will be assumed that a Y-initiate logic signal has occurred and that no X-signal appeared during the first time period $\Delta T_1$. A negative pulse from delay multivibrator 66 is applied to differentiating circuit 74 which generates a positive trigger pulse corresponding in time to the trailing edge of said negative pulse. This trigger pulse is applied to delay multivibrator 72 and serves to initiate a second pulse period $\Delta T_2$. An X-signal occurring during the $\Delta T_2$ period is regarded as valid.

It will be assumed that an X-signal from AND-gate 48 is applied to the X-terminal of the decision logic during time $\Delta T_2$. The X-signal is applied to AND-gate 76 in coincidence with a positive signal from delay multivibrator 72. An output signal from AND-gate 76 represents an OUTPUT from the detector system indicating that an "over-the-peak" condition has occurred. Additionally, the AND-gate 76 output effects a setting of flip-flop 70, which in turn results in the reset control signal being applied to the reset terminals of threshold detectors 42 and 44, and to delay multivibrator 72, to terminate the pulse period $\Delta T_2$.

If in a third situation, no X-signal occur during the $\Delta T_2$ time, the differentiating circuit 78 which is operatively connected to receive the negative pulse output from delay multivibrator 72 generates a trigger pulse corresponding in time to the trailing edge of said negative pulse. The trigger pulse from differentiating circuit 78 passes through OR-gate 70 and sets flip-flop 60, which generates the reset control signal. The reset control signal is applied to threshold detectors 42 and 44 and is present until the analog signal input conditions are such that no Y-signals exist. Stated another way, reset control is present until the input detector stages have resumed their steady state conduction and the $Th_1$ and $Th_2$ outputs of the detectors are both "low." With a return to steady state conditions, inverter 62 of the decision logic returns flip-flop 60 to the reset state, thereby terminating the reset control signal.

The operation of the detection systems described hereinbefore assumed that a negative-going signal, as in FIG. 2a, was applied to the $e_{in}$ input terminals in FIGS. 3 and 4. It is obvious that the circuit action for a positive-going signal applied to the last-mentioned terminals is identical except that the behavior of the input threshold switch stages in each case is interchanged.

It should be apparent from the foregoing description of the invention and its mode of operation that there is provided a peak signal detection signal which although employing a minimal number of components and logic gating, provides peak indications substantially close to the true signal peak. The system is therefore useful in a wide variety of applications.

It should be understood that changes and modifications of the arrangements described herein may be required to fit particular operating requirements. These changes and modifications, in so far as they are not departures from the true scope of the present invention, are intended to be covered by the claims appended hereto.

What is claimed is:

1. A signal peak detection system for receiving an input push-pull electrical signal comprising first and second threshold detectors each having an input and an output terminal, the in-phase and phase-inverted forms of said input signal being applied respectively to the input terminals of said threshold detectors, each of said detectors including a current amplifying stage, a capacitor connecting said input terminal of each detector to its associated current amplifying stage, sensitizing means coupled to the output terminals of said detectors and being responsive to predetermined signal levels appearing thereon for providing each of said stages with bias currents of sufficient amplitude and proper polarity to insure the conduction thereof, each of said stages being normally in a conducting state in the absence of said electrical signal, the degree of conduction of the stages being a function of the respective instantaneous amplitudes of said in-phase and phase-inverted forms of said electrical signal and the electrical charges on the capacitors associated therewith, one of said forms of input signal initially causing the first detector stage to cease conduction, the other of said forms of input signal concurrently causing increased conduction in the second detector stage and the charging of its associated capacitor, said sensitizing means terminating the flow of bias currents to both detector stages in response to the signal level appearing on the first detector output terminal as a result of said cessation of conduction, the conducting state of second detector stage being unaffected by the removal of bias current therefrom because of the nature of the electrical signal applied to its input terminal, the passage of said input electrical signal through its maximum absolute amplitude resulting in the diminution of conduction in the second detector stage and the subsequent discharge of its associated capacitor, whereby said last-mentioned stage is driven to a nonconducting state, both said detector stages being nonconductive at this time, the signal levels appearing respectively on the detector output terminals during the coincident nonconduction of the detector stages providing an indication of the occurrence of a peak condition in the input signal.

2. A signal peak detection system as defined in claim 1 further characterized in that each of said current amplifying stages has an input, an output and a control electrode, each of said capacitors being connected between a detector input terminal and the control electrode of the amplifying stage associated with that detector, the input electrodes of said stages being connected in common to a source of reference potential, first and second impedance means for coupling the respective output electrodes of said stages to a source of supply potential, third and fourth impedance means for coupling the respective control electrodes of said stages to said sensitizing means, the output terminals of said pair of threshold detectors corresponding electrically to the respective output electrodes of said current amplifying stages.

3. A signal peak detection system as defined in claim 2 wherein said sensitizing means comprises a current amplifying device having an input, an output and a control electrode, the input electrode of said device being connected to said source of reference potential, fifth and sixth impedance means for coupling the respective output terminals of said detectors to the control electrode of said device, a seventh impedance means for coupling the output electrode of said device to said source of supply potential said third and fourth impedance means coupling the respective control electrodes of said detector stages to the output electrode of said device.

4. The signal peak detection system as defined in claim 3 further including reset means comprising for each of said detectors the series combination of a resistor and a diode for coupling the control electrode of each stage to a source of reset control current.

5. A signal peak detection system as defined in claim 4 wherein said detector stages and said current amplifying device are transistors and said input, output and control electrodes are respectively, emitter, collector and base electrodes.

6. A signal peak detection system as defined in claim 1 wherein said sensitizing means comprises a NOR gate having a pair of input terminals and an output terminal, the output terminals of said detectors being coupled to the input terminals of said NOR gate, means coupling the output terminal of said NOR gate to said detector stages for providing said bias current therefor.

7. A signal peak detection system as defined in claim 6 further including reset means coupled to said detector stages and adapted to be energized from a source of reset control current capable of causing said stages to assume their normally conducting state.

8. A signal peak detection system as defined in claim 7 further including decision logic means having first and second input terminals, a reset control terminal and a system output terminal, means coupling the output terminal of said NOR gate to said first decision logic means input terminal for selectively initiating processing activity therein and terminating the generation of reset control current thereby, means for coupling said reset control terminal of said decision logic means to said reset means, a first AND gate having a pair of input terminals and an output terminal, means coupling said detector output terminals respectively to said AND gate input terminals, the signal levels appearing respectively on said AND gate input terminals during said coincident nonconduction of the detector stages allowing said AND gate to provide a peak indication signal to said second decision logic means input terminal, said decision logic means providing at said system output terminal an output signal indicative of a valid detection.

9. A signal peak detection system as defined in claim 8 wherein said decision logic means comprises a flip-flop circuit having set and reset terminals, inverter means coupling said first input terminal of said decision logic means to the reset terminal of said flip-flop circuits, a first differentiating circuit coupled to said first decision logic input terminal, a first delay multivibrator having an input terminal coupled to said first differentiating circuit and a pair of output terminals for providing outputs of opposite polarity and predetermined duration in response to a trigger pulse from said first differentiating circuit, second and third AND gates each having a pair of input terminals and an output terminal, an OR gate having first, second and third input terminals and an output terminal, the output terminal of said OR gate being coupled to the set terminal of said flip-flop circuit, means coupling said second decision logic input terminal and one of said output terminals of said first delay multivibrator to the respective input terminals of said second AND gate, the output terminals of said second AND gate being coupled to said first input terminal of said OR gate, a second differentiating circuit coupled to the other output terminals of said first delay multivibrator, a second delay multivibrator having an input terminal coupled to said second differentiating circuit and a pair of output terminals for providing pulse outputs of opposite polarity and predetermined duration in response to a trigger pulse from said second differentiating circuit, means coupling said second decision logic input terminal and one of said output terminals of said second delay multivibrator to the respective input terminals of said third AND gate, the output terminal of said third AND gate corresponding electrically to said system output terminal and being coupled to said second input terminal of said OR gate, a third differentiating circuit being coupled to said third input terminal of said OR gate, the setting of said flip-flop circuit in response to an output signal from said OR gate causing said flip-flop circuit to generate a reset control pulse on said reset control terminal, said reset pulse being applied concurrently to said second delay multivibrator to inhibit the operation thereof, and to the reset means of both said threshold detectors.

* * * * *

PO-1050
(5/69)

UNITED STATES PATENT OFFICE
CERTIFICATE OF CORRECTION

Patent No. 3,628,060                    Dated December 14, 1971

Inventor(s) Richard L. Fussell

It is certified that error appears in the above-identified patent and that said Letters Patent are hereby corrected as shown below:

On the front page, immediately below "[45] Patented Dec. 14, 1971" insert -- [73] Assignee Burroughs Corporation Detroit, Michigan -- . Column 3, line 15, the equation should read $--de_{in}/dt \geq I_{on}/C--$ ; column 3, line 16, the equation should read $-- -\Delta V \geq V_{BE(Sw)} --$ . Column 4, line 13, "-dr/dt" should read -- -dv/dt -- . Column 7, line 5, for "signal" read --system-- .

Signed and sealed this 30th day of May 1972.

(SEAL)
Attest:

EDWARD M. FLETCHER, JR.                ROBERT GOTTSCHALK
Attesting Officer                       Commissioner of Patents